(12) United States Patent
Nemit, Jr.

(10) Patent No.: US 9,759,469 B2
(45) Date of Patent: Sep. 12, 2017

(54) SYSTEM AND METHOD FOR CONTROLLING A VARIABLE SPEED DRIVE OF A COMPRESSOR MOTOR

(75) Inventor: Paul Nemit, Jr., Waynesboro, PA (US)

(73) Assignee: Johnson Controls Technology Company, Holland, MI (US)

( * ) Notice: Subject to any disclaimer, the term of this patent is extended or adjusted under 35 U.S.C. 154(b) by 634 days.

(21) Appl. No.: 14/238,340

(22) PCT Filed: Aug. 31, 2012

(86) PCT No.: PCT/US2012/053291
§ 371 (c)(1),
(2), (4) Date: Feb. 11, 2014

(87) PCT Pub. No.: WO2013/033502
PCT Pub. Date: Mar. 7, 2013

(65) Prior Publication Data
US 2014/0196490 A1    Jul. 17, 2014

Related U.S. Application Data

(60) Provisional application No. 61/529,437, filed on Aug. 31, 2011.

(51) Int. Cl.

| | |
|---|---|
| *C09K 5/04* | (2006.01) |
| *F25B 1/00* | (2006.01) |
| *F25D 9/00* | (2006.01) |
| *F25B 43/02* | (2006.01) |
| *H02P 27/04* | (2016.01) |

(Continued)

(52) U.S. Cl.
CPC ............ *F25B 49/022* (2013.01); *F04B 35/04* (2013.01); *F04B 49/065* (2013.01); *F04C 28/08* (2013.01); *F04B 2203/0202* (2013.01); *F04B 2203/0204* (2013.01); *F04B 2203/0205* (2013.01); *F04C 29/0085* (2013.01); *F04C 2240/403* (2013.01); *F04C 2240/81* (2013.01); *F04C 2270/80* (2013.01); *F04C 2270/86* (2013.01); *F24F 2011/0083* (2013.01); *F25B 2600/021* (2013.01); *Y02B 30/741* (2013.01)

(58) Field of Classification Search
CPC ...... F04B 2203/0202; F04B 2203/0204; F04B 35/04; F04B 49/065; F04C 2240/403; F04C 2240/81; F25B 2600/021; F25B 49/022; Y02B 30/741
USPC ........................................ 62/402, 473; 417/3
See application file for complete search history.

(56) References Cited

U.S. PATENT DOCUMENTS

| | | |
|---|---|---|
| 4,052,648 A | 10/1977 | Nola |
| 4,249,120 A | 2/1981 | Earle |

(Continued)

OTHER PUBLICATIONS

VFD Fundamentals, Copyright 2003 Kilowatt Classroom, LLC.*

*Primary Examiner* — Henry Crenshaw
(74) *Attorney, Agent, or Firm* — Fletcher Yoder, P.C.

(57) ABSTRACT

A variable speed drive (VSD) can be used to vary the voltage-to-frequency ratio (V/f) supplied to a compressor motor of a heating, ventilation, air conditioning or refrigeration (HVAC&R) system to make the motor stronger or weaker to compensate for varying conditions in the HVAC&R system. The VSD and corresponding control system or algorithm can monitor an operating parameter of the HVAC&R system, such as the kW absorbed by the motor, and then raise or lower the V/f of the VSD to obtain the lowest possible power consumption from the motor.

14 Claims, 13 Drawing Sheets

(51) Int. Cl.
　　*H02P 23/00*　　　(2016.01)
　　*F04B 35/04*　　　(2006.01)
　　*G05B 21/00*　　　(2006.01)
　　*F25B 49/02*　　　(2006.01)
　　*F04C 28/08*　　　(2006.01)
　　*F04B 49/06*　　　(2006.01)
　　*F24F 11/00*　　　(2006.01)
　　*F04C 29/00*　　　(2006.01)

(56) References Cited

U.S. PATENT DOCUMENTS

| | | | |
|---|---|---|---|
| 4,291,264 A | 9/1981 | Siemon | |
| 4,554,491 A * | 11/1985 | Plunkett | H02K 29/08 |
| | | | 310/186 |
| 4,663,942 A | 5/1987 | Kanazawa | |
| 4,738,118 A | 4/1988 | Kanazawa | |
| 5,272,428 A * | 12/1993 | Spiegel | G05B 13/0275 |
| | | | 318/803 |
| 5,272,429 A * | 12/1993 | Lipo | H02P 6/187 |
| | | | 318/802 |
| 5,899,091 A * | 5/1999 | Fraser, Jr. | F25B 31/002 |
| | | | 62/473 |
| 6,301,922 B1 * | 10/2001 | Ochi | F24F 5/0085 |
| | | | 62/176.4 |
| 6,487,869 B1 * | 12/2002 | Sulc | B60H 1/3205 |
| | | | 62/228.4 |
| 7,481,069 B2 | 1/2009 | Lifson et al. | |
| 2001/0054294 A1 * | 12/2001 | Tsuboi | F04C 28/08 |
| | | | 62/228.4 |
| 2005/0019640 A1 * | 1/2005 | Formanski | H01M 8/04126 |
| | | | 429/413 |
| 2005/0188708 A1 | 9/2005 | Wills et al. | |
| 2008/0175717 A1 * | 7/2008 | Schnetzka | F04B 39/0027 |
| | | | 417/3 |
| 2009/0314082 A1 * | 12/2009 | Sujan | F01D 17/06 |
| | | | 73/497 |
| 2010/0083693 A1 | 4/2010 | Todd et al. | |

\* cited by examiner

SYSTEM AND METHOD FOR CONTROLLING A VARIABLE SPEED DRIVE OF A COMPRESSOR MOTOR

CROSS REFERENCE TO RELATED APPLICATIONS

This application claims the benefit of and priority to U.S. Provisional Application No. 61/529,437, filed Aug. 31, 2011, entitled VARIABLE SPEED DRIVE CONTROL SYSTEM AND METHOD, which is hereby incorporated by reference in its entirety.

BACKGROUND

The application generally relates to variable speed drives. The application relates more specifically to controlling the ratio of voltage to frequency output by a variable speed drive or variable frequency drive.

In a chiller system or other heating, ventilation, air conditioning or refrigeration (HVAC&R) system where the compressor is coupled with a variable frequency drive (VFD) or variable speed drive (VSD), the compressor motor is typically sized to operate at a particular voltage-to-frequency (V/f) ratio and a particular load point. Because the compressor in the actual system can operate during a variety of conditions, the motor is typically not operating at peak efficiency.

Therefore, what is needed is a variable speed drive or variable frequency drive that can vary the ratio of voltage to frequency to compensate for varying load conditions.

SUMMARY

The present invention is directed to a system having a compressor, a condenser, an expansion device and an evaporator connected in a closed refrigerant circuit. The system includes a motor connected to the compressor to power the compressor and a variable speed drive connected to the motor to power the motor. The variable speed drive is operable to provide a variable voltage to the motor and a variable frequency to the motor. The system also includes a control panel to control operation of the variable speed drive and one or more components of the system and a sensor to measure an operational parameter of the system. The sensor is operable to communicate the measured operational parameter to the control panel. The control panel is operable to execute a control algorithm to determine a voltage-to-frequency ratio to be output by the variable speed drive using the measured operational parameter, and the voltage-to-frequency ratio varies based on the measured operational parameter.

The present invention is also directed to a method for controlling a variable speed drive. The method includes measuring an operating parameter of an HVAC&R system and determining a voltage to frequency ratio to be output by a variable speed drive using the measured operational parameter. The variable speed drive powers a compressor motor of the HVAC&R system. The method also includes generating control instructions for the variable speed drive based on the determined voltage to frequency ratio and adjusting the output voltage to frequency ratio provided by the variable speed drive to the compressor motor with the generated control instructions.

In the present application, the VFD or VSD can vary the V/f supplied to the motor to make the motor stronger or weaker to compensate for the varying conditions in an HVAC&R system. The VFD or VSD and corresponding controls can monitor the motor's power consumption (kW) absorbed by the motor and then raise or lower the V/f of the VFD or VSD to obtain the lowest possible power consumption from the motor.

One advantage of the present application is lower power consumption by the compressor motor which leads to energy savings.

Another advantage of the present application is the ability to correspond the ratio of voltage to frequency provided to the compressor motor based on the load conditions on the compressor. The correspondence of the ratio of voltage to frequency to the load conditions enables the compressor motor to operate at peak efficiency and thereby reduce power consumption.

Other features and advantages of the present invention will be apparent from the following, more detailed description of the preferred embodiments, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE EMBODIMENTS

Figure 1:
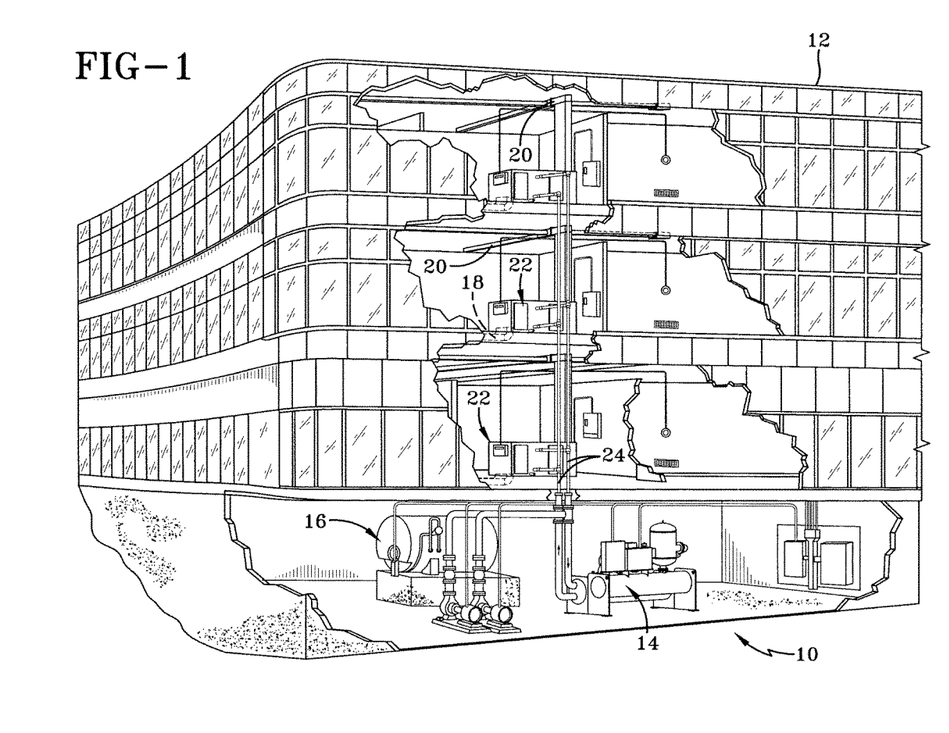
FIG. 1 shows an exemplary embodiment for a heating, ventilation and air conditioning system.

FIG. 1 shows an exemplary environment for a heating, ventilation and air conditioning (HVAC) system 10 in a building 12 for a typical commercial setting. The system 10 can include a vapor compression system 14 that can supply a chilled liquid which may be used to cool the building 12. The system 10 can include a boiler 16 to supply heated liquid that may be used to heat the building 12 and an air distribution system which circulates air through the building 12. The air distribution system can also include an air return duct 18, an air supply duct 20 and an air handler 22. The air handler 22 can include a heat exchanger that is connected to the boiler 16 and vapor compression system 14 by conduits 24. The heat exchanger in the air handler 22 may receive either heated liquid from the boiler 16 or chilled liquid from the vapor compression system 14, depending on the mode of operation of the system 10. The system 10 is shown with a separate air handler on each floor of the building 12, but it is appreciated that the components may be shared between or among floors.

Figure 2:
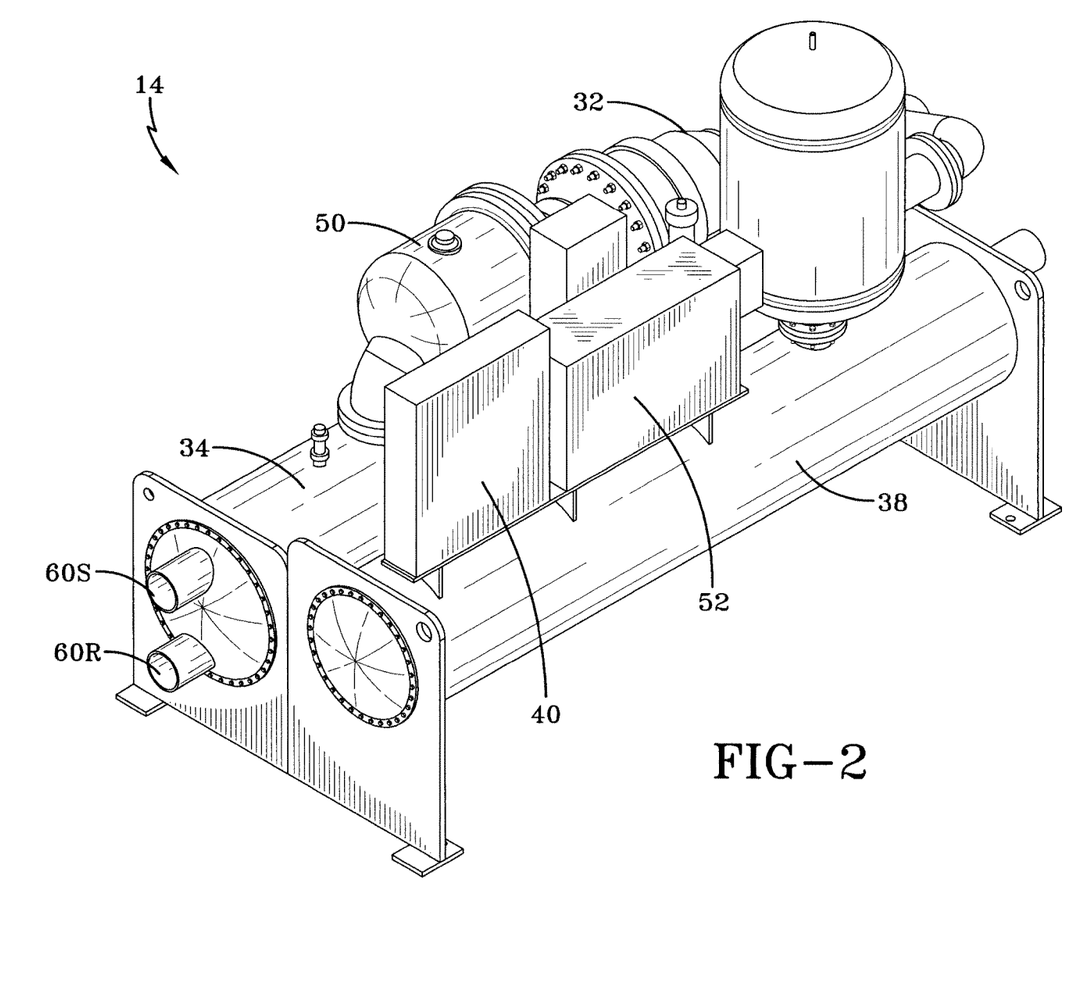
FIG. 2 shows an isometric view of an exemplary vapor compression system.
Figure 3:
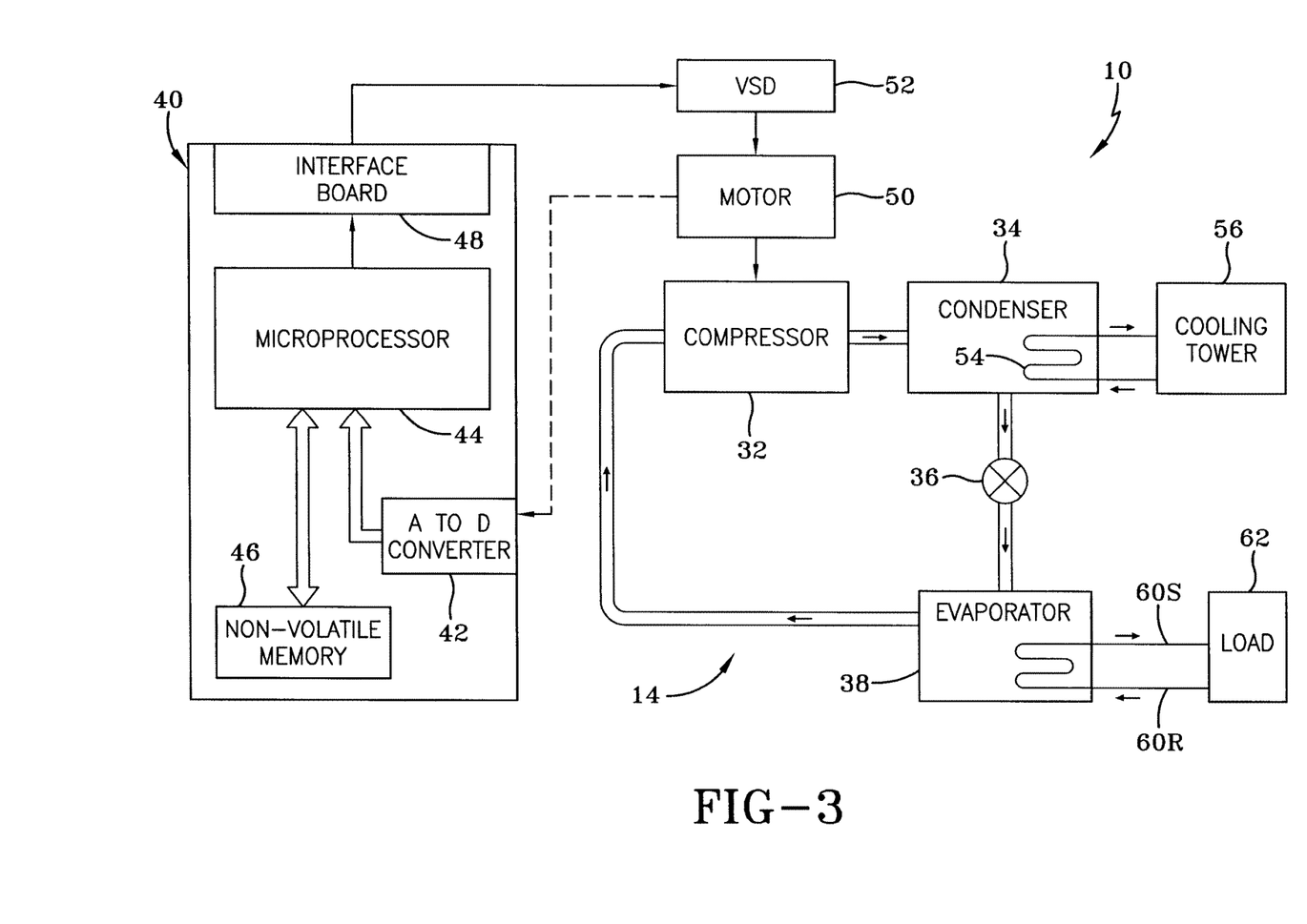
FIGS. 3 and 4 schematically show exemplary embodiments of a vapor compression system.

FIGS. 2 and 3 show an exemplary vapor compression system 14 that can be used in an HVAC system 10. The vapor compression system 14 can circulate a refrigerant through a circuit starting with a compressor 32 and including a condenser 34, expansion valve(s) or device(s) 36, and an evaporator or liquid chiller 38. The vapor compression system 14 can also include a control panel 40 that can include an analog to digital (A/D) converter 42, a microprocessor 44, a non-volatile memory 46, and an interface board 48. Some examples of fluids that may be used as refrigerants in the vapor compression system 14 are hydrofluorocarbon (HFC) based refrigerants, for example, R-410A, R-407, R-134a, hydrofluoro olefin (HFO), "natural" refrigerants like ammonia ($NH_3$), R-717, carbon dioxide ($CO_2$), R-744, or hydrocarbon based refrigerants, water vapor or any other suitable type of refrigerant. In an exemplary embodiment, the vapor compression system 14 may use one or more of each of variable speed drive (VSD) 52, motor 50, compressor 32, condenser 34, expansion valve 36 and/or evaporator 38 in one or more refrigerant circuits.

The motor 50 used with the compressor 32 can be powered by a VSD 52. The VSD 52 receives AC power having a particular fixed line voltage and fixed line frequency from the AC power source and provides power having a variable voltage and frequency to the motor 50. The motor 50 can include any type of electric motor that can be powered by a VSD. The motor 50 can be any suitable motor type, for example, a switched reluctance motor, an induction motor, or an electronically commutated permanent magnet motor.

The compressor 32 compresses a refrigerant vapor and delivers the vapor to the condenser 34 through a discharge passage. The compressor 32 can be a screw compressor in one exemplary embodiment. However, the compressor 32 can be any suitable type of positive displacement compressor or a centrifugal compressor. The refrigerant vapor delivered by the compressor 32 to the condenser 34 transfers heat to a fluid, for example, water or air. The refrigerant vapor condenses to a refrigerant liquid in the condenser 34 as a result of the heat transfer with the fluid. The liquid refrigerant from the condenser 34 flows through the expansion device 36 to the evaporator 38. In the exemplary embodiment shown in FIG. 3, the condenser 34 is water cooled and includes a tube bundle 54 connected to a cooling tower 56.

The liquid refrigerant delivered to the evaporator 38 absorbs heat from another fluid, which may or may not be the same type of fluid used for the condenser 34, and undergoes a phase change to a refrigerant vapor. In the exemplary embodiment shown in FIG. 3, the evaporator 38 includes a tube bundle having a supply line 60S and a return line 60R connected to a cooling load 62. A process fluid, for example, water, ethylene glycol, calcium chloride brine, sodium chloride brine, or any other suitable liquid, enters the evaporator 38 via the return line 60R and exits the evaporator 38 via the supply line 60S. The evaporator 38 lowers the temperature of the process fluid in the tubes. The tube bundle in the evaporator 38 can include a plurality of tubes and a plurality of tube bundles. The vapor refrigerant exits the evaporator 38 and returns to the compressor 32 by a suction line to complete the cycle.

Figure 4:
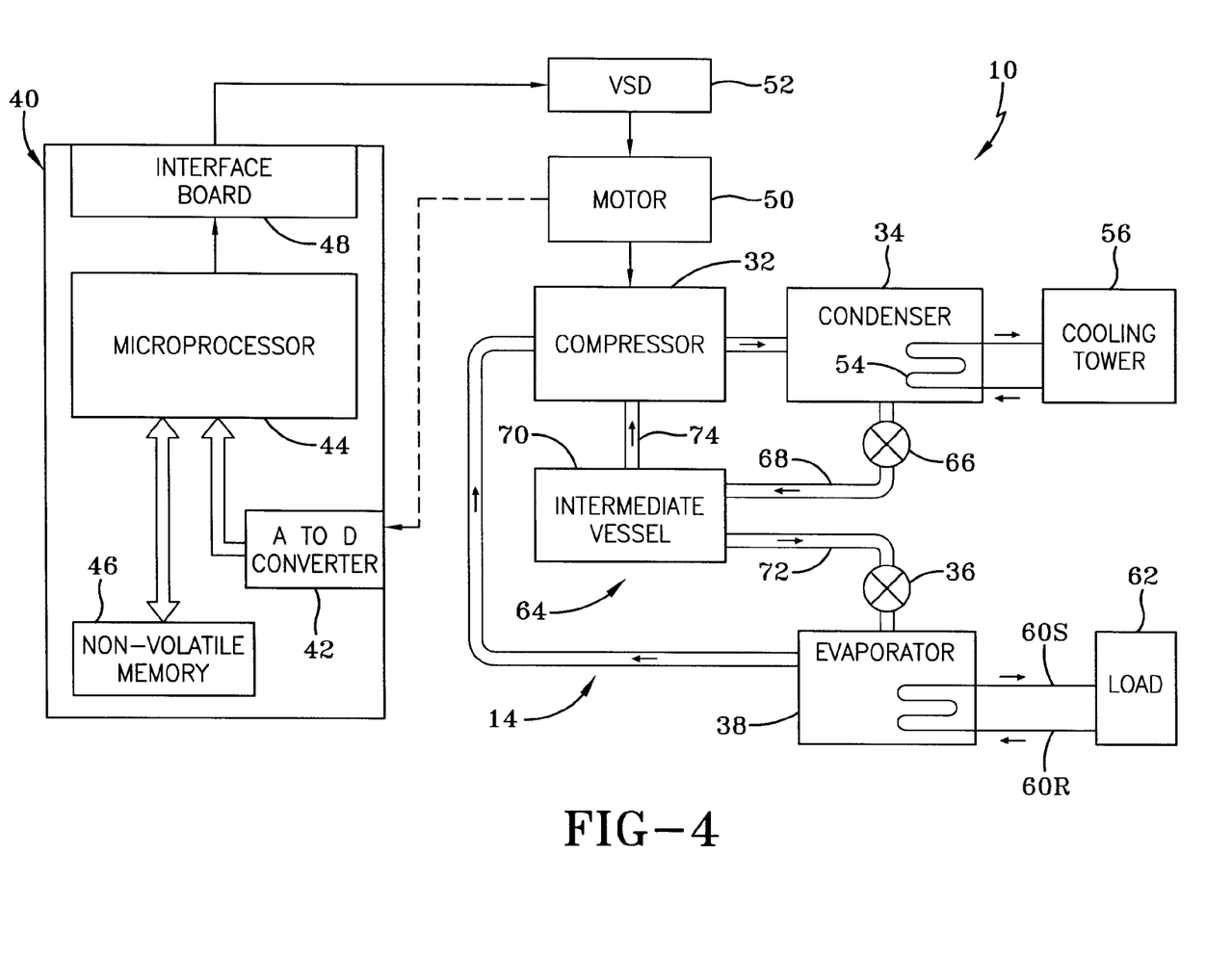

FIG. 4, which is similar to FIG. 3, shows the vapor compression system 14 with an intermediate circuit 64 incorporated between the condenser 34 and the expansion device 36. The intermediate circuit 64 has an inlet line 68 that can be either connected directly to or can be in fluid communication with the condenser 34. As shown, the inlet line 68 includes an expansion device 66 positioned upstream of an intermediate vessel 70. The intermediate vessel 70 can be a flash tank, also referred to as a flash intercooler, in an exemplary embodiment. In an alternate exemplary embodiment, the intermediate vessel 70 can be configured as a heat exchanger or a "surface economizer." In the configuration shown in FIG. 4, the intermediate vessel 70 is a flash tank and the expansion device 66 operates to lower the pressure of the liquid received from the condenser 34. During the expansion process, a portion of the liquid vaporizes. The intermediate vessel 70 may be used to separate the vapor from the liquid received from the expansion device 66 and may also permit further expansion of the liquid. The vapor may be drawn by the compressor 32 from the intermediate vessel 70 through a line 74 to the suction inlet, a port at a pressure intermediate between suction and discharge or an intermediate stage of compression. The liquid that collects in the intermediate vessel 70 is at a lower enthalpy from the expansion process. The liquid from the intermediate vessel 70 flows in a line 72 through a second expansion device 36 to the evaporator 38.

In an exemplary embodiment, a compressor 32 can include a compressor housing that contains the working parts of the compressor 32. Vapor from the evaporator 38 can be directed to an intake passage of the compressor 32. The compressor 32 compresses the vapor with a compression mechanism and delivers the compressed vapor to the condenser 34 through a discharge passage. The motor 50 may be connected to the compression mechanism of the compressor 32 by a drive shaft.

Vapor flows from the intake passage of a positive displacement compressor 32 and enters a compression pocket of the compression mechanism. The compression pocket is reduced in size by the operation of the compression mechanism to compress the vapor. The compressed vapor can be discharged into the discharge passage. For example, for a screw compressor, the compression pocket is defined between the surfaces of the rotors of the compressor. As the rotors of the compressor engage one another, the compression pockets between the rotors of the compressor, also referred to as lobes, are reduced in size and are axially displaced to a discharge side of the compressor.

Figure 5:
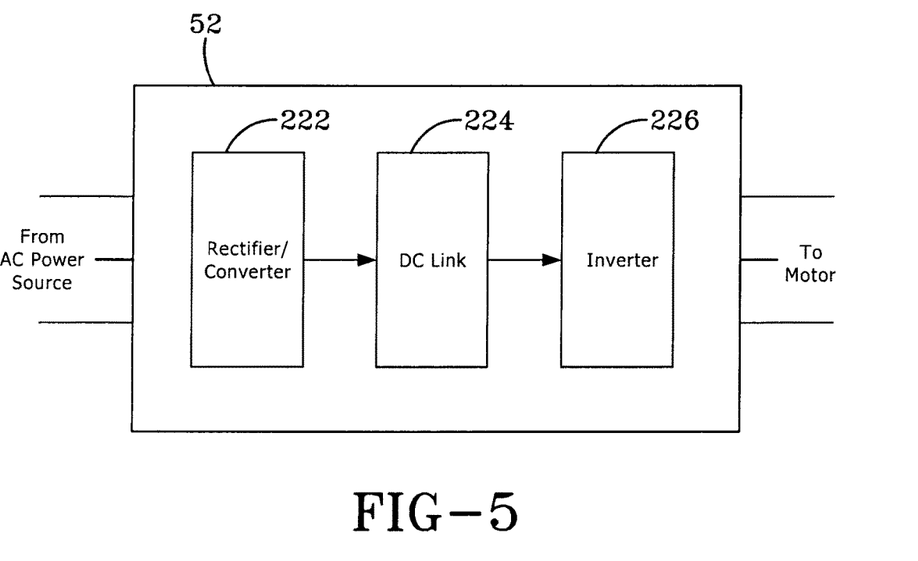
FIG. 5 schematically shows an exemplary embodiment of a variable speed drive.
Figure 6:
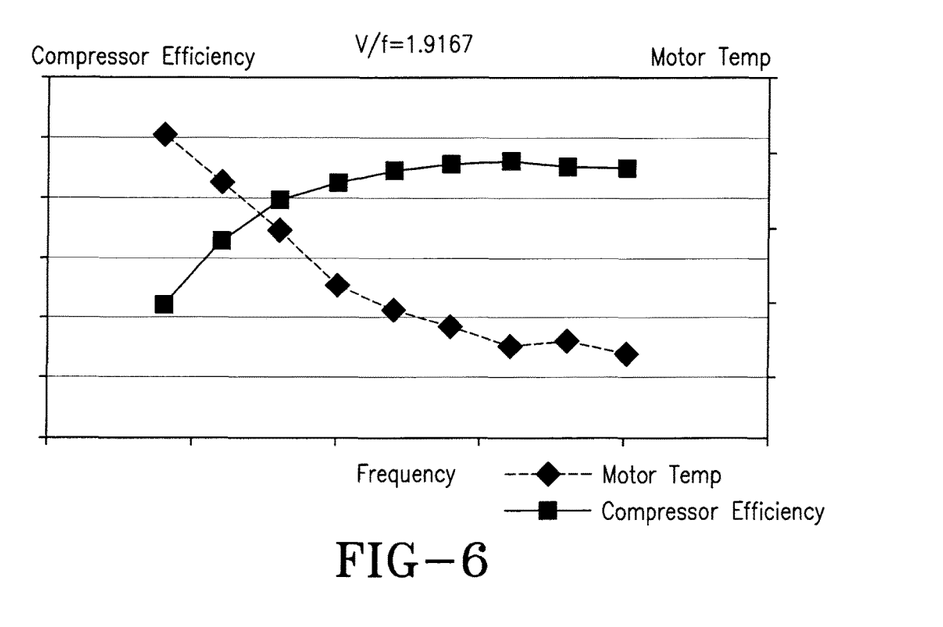
FIGS. 6-11 show charts of motor temperature and compressor efficiency versus frequency for different V/f ratios used in an exemplary HVAC&R system.
Figure 7:
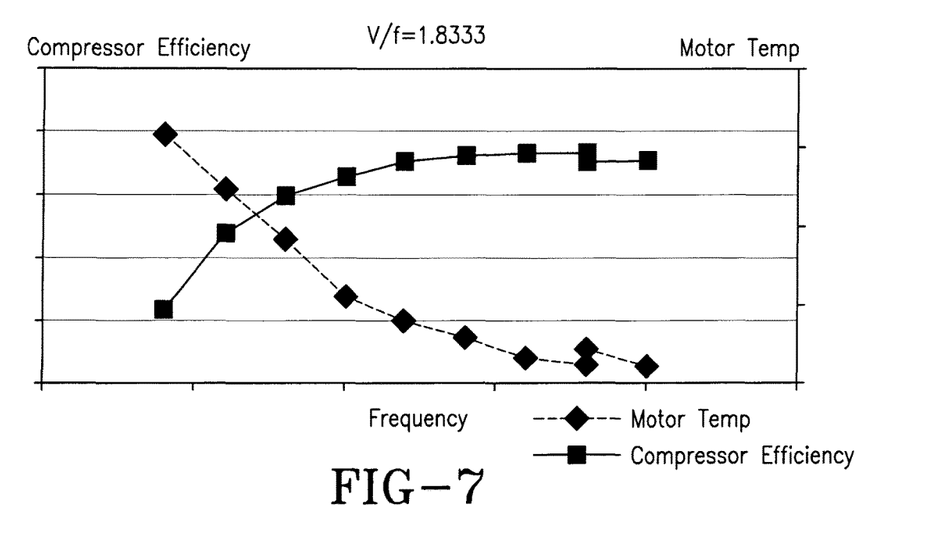
Figure 8:
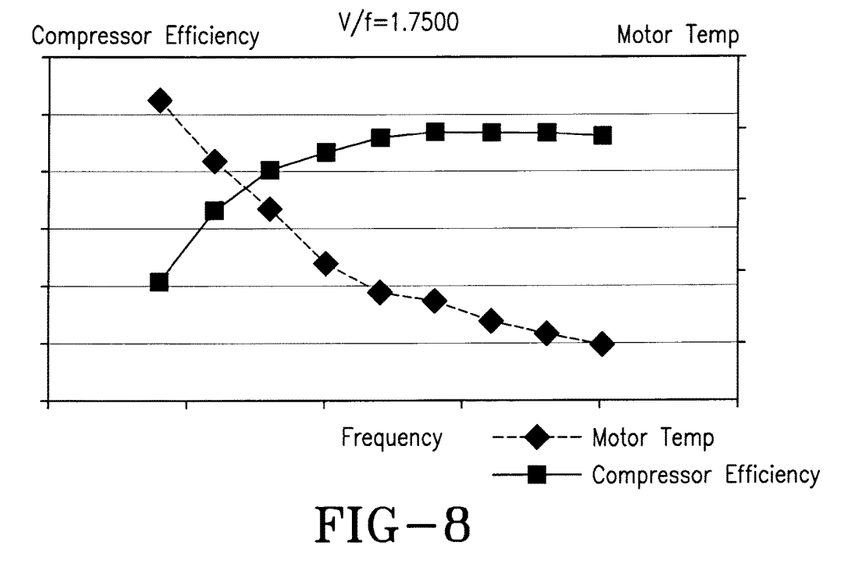
Figure 9:
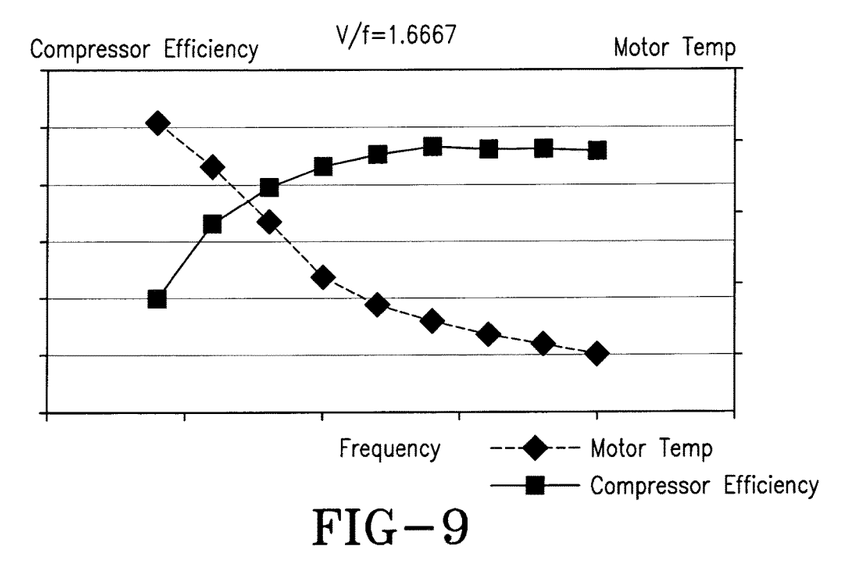
Figure 10:
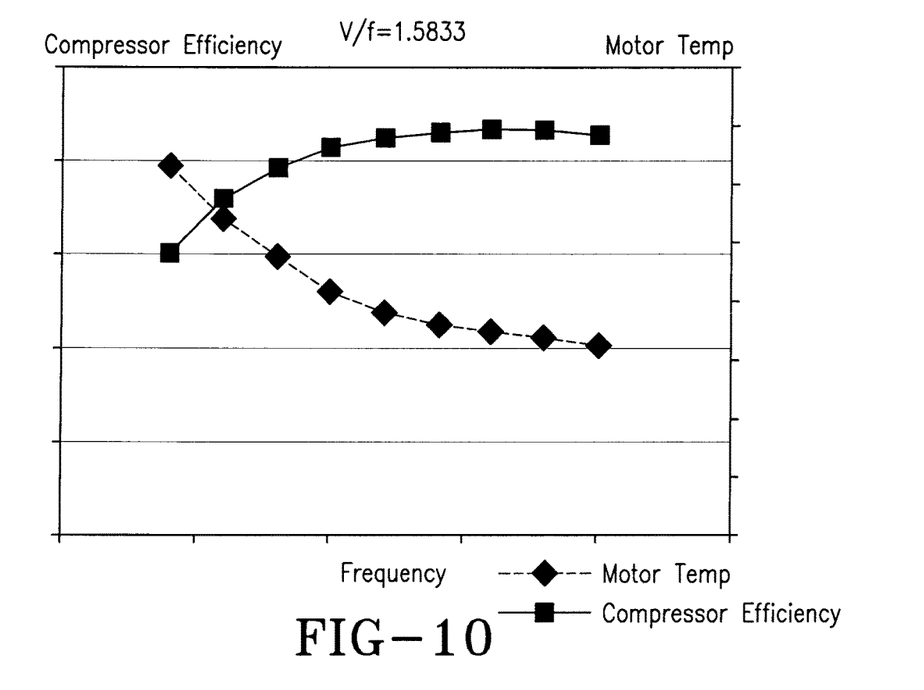
Figure 11:
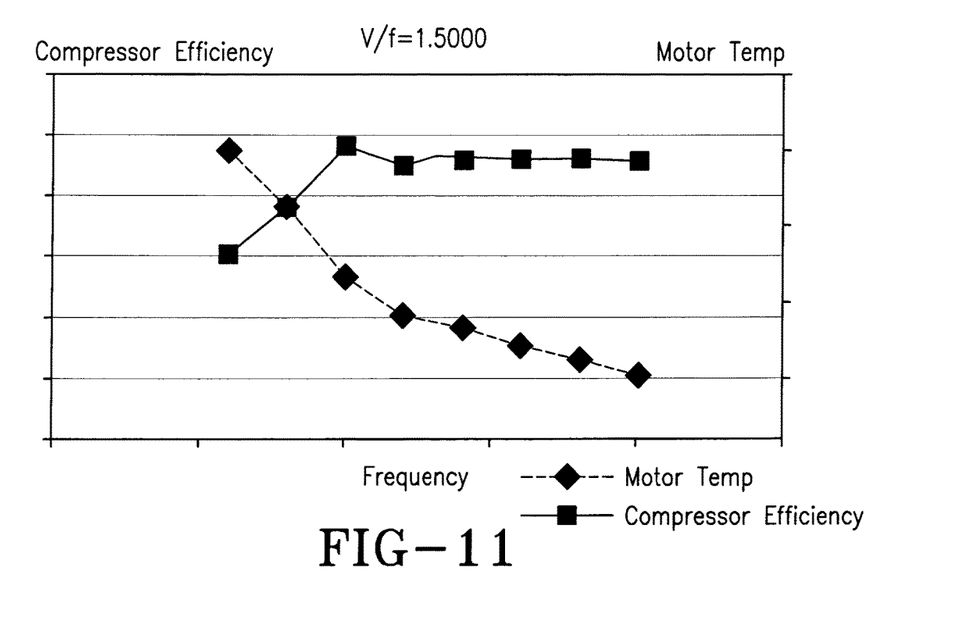
Figure 12:
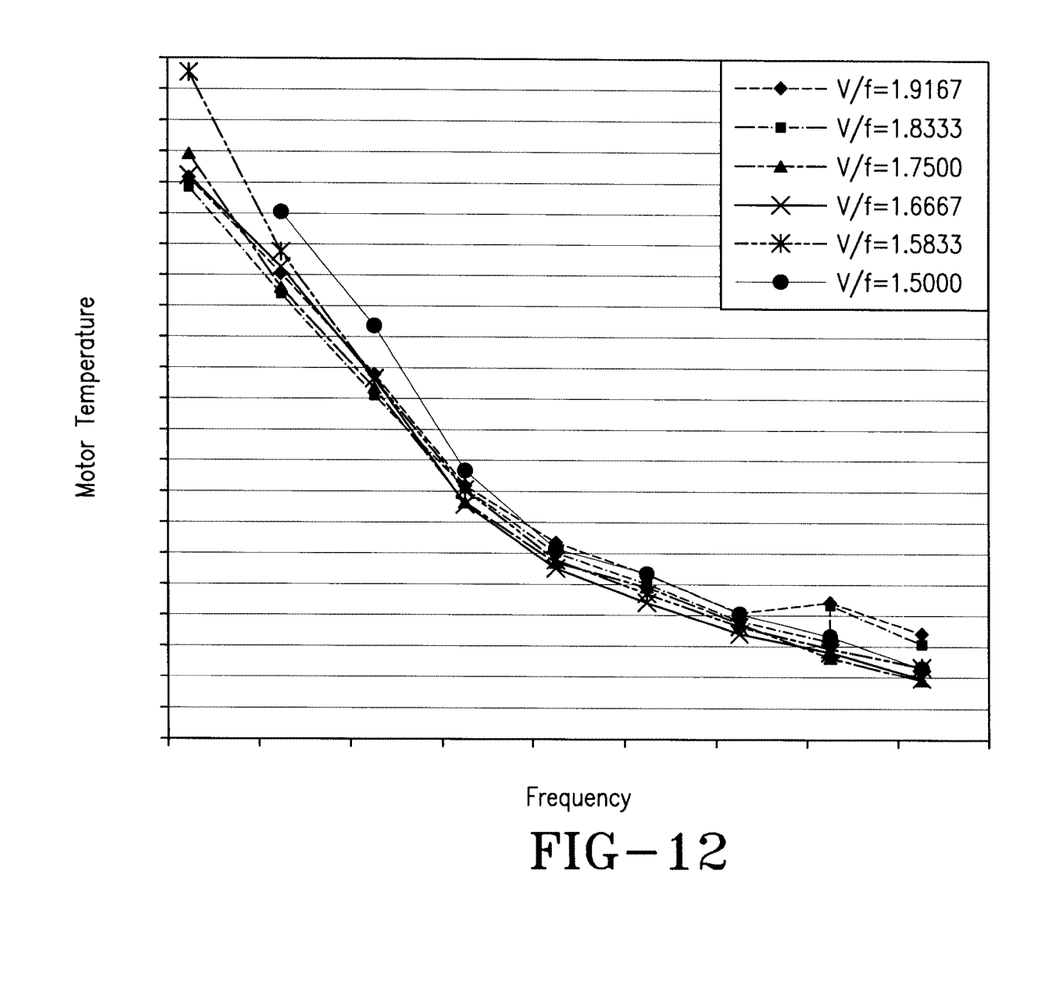
FIG. 12 shows a chart of motor temperature versus frequency for the different V/f ratios from FIGS. 6-11.
Figure 13:
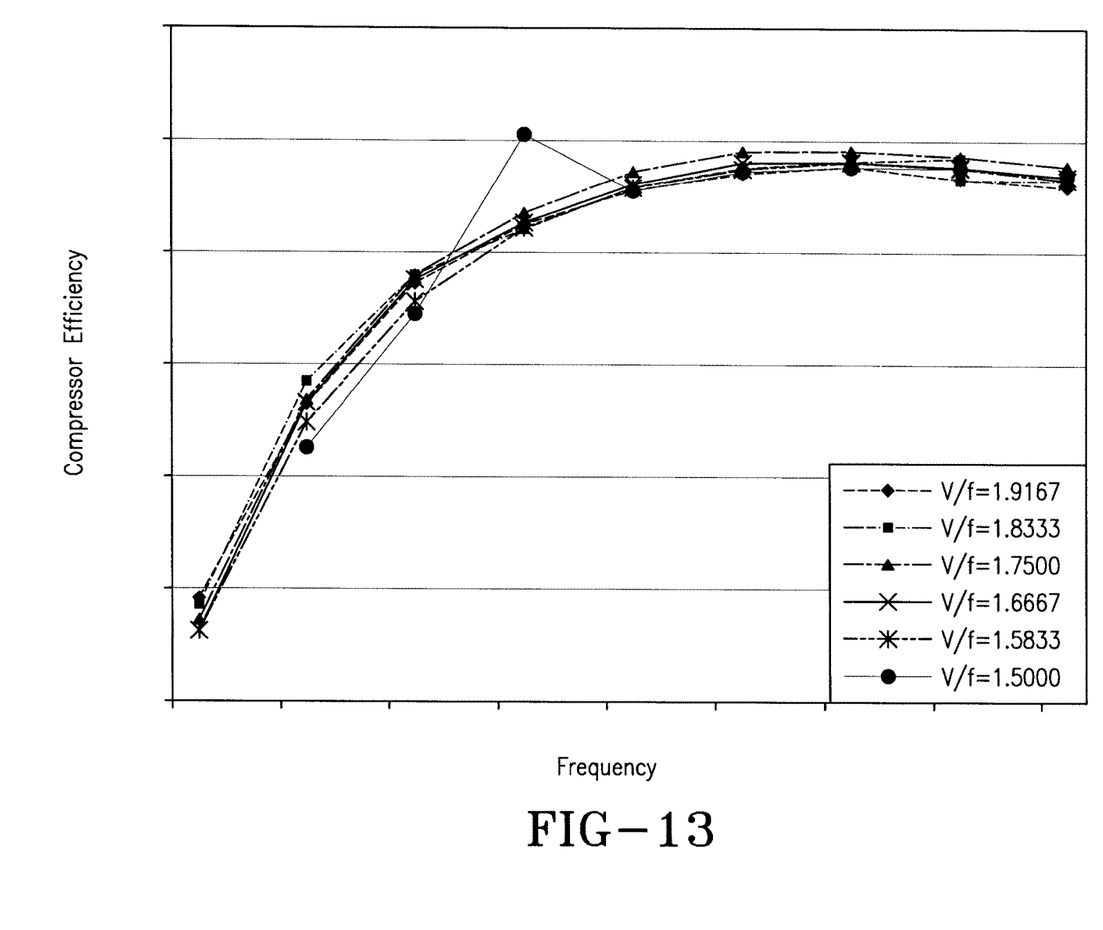
FIG. 13 shows a chart of compressor efficiency versus frequency for the different V/f ratios from FIGS. 6-11.

FIG. 5 shows an exemplary embodiment of a VSD. The VSD 52 receives AC power having a particular fixed line voltage and fixed line frequency from an AC power source and provides AC power to a motor 50 at a desired voltage and desired frequency, both of which can be varied to satisfy particular requirements. The VSD 52 can have three components: a rectifier/converter 222, a DC link 224 and an inverter 226. The rectifier/converter 222 converts the fixed frequency, fixed magnitude AC voltage from the AC power source into DC voltage. The DC link 224 filters the DC power from the converter 222 and provides energy storage components such as capacitors and/or inductors. Finally, the inverter 226 converts the DC voltage from the DC link 224 into variable frequency, variable magnitude AC voltage for the motor 50.

In an exemplary embodiment, the rectifier/converter 222 may be a three-phase pulse width modulated boost rectifier having insulated gate bipolar transistors to provide a boosted DC voltage to the DC link 224 to obtain a maximum RMS output voltage from the VSD 52 greater than the input voltage to the VSD 52. Alternately, the converter 222 may be a passive diode or thyristor rectifier without voltage-boosting capability.

The VSD 52 can provide a variable magnitude output voltage and a variable frequency to the motor 50, to permit effective operation of the motor 50 in response to particular load conditions. The control panel 40 can provide control signals to the VSD 52 to operate the VSD 52 and the motor 50 at appropriate operational settings for the particular sensor readings received by the control panel 40. For example, the control panel 40 can provide control signals to the VSD 52 to adjust the output voltage and output frequency provided by the VSD 52 in response to changing conditions in the vapor compression system 14. In one exemplary embodiment, the control panel 40 can provide instructions to increase or decrease the output voltage and output frequency, while maintaining the same V/f ratio, provided by the VSD 52 in response to increasing or decreasing load conditions on the compressor 32.

However, in another exemplary embodiment, the control panel 40 can individually increase or decrease the output voltage and/or the output frequency from the VSD 52 to obtain different V/f ratios from the VSD 52. In one exemplary embodiment, the control panel can adjust the V/f ratio based on the motor's power consumption (kW). However, in other embodiments, different operating parameters (e.g., compressor discharge temperature or motor temperature), can be used in addition to or instead of the motor's power consumption. The control panel can select the appropriate V/f ratio for the VSD from one or more look-up tables based the current or measured operating conditions or parameters of the motor and/or system. The look-up tables can be generated as part of the system start-up process (either at the factory or at the site) and involves operating the system at varying conditions to determine the optimal V/f ratio for particular conditions. In another embodiment, the control panel can determine an operating frequency for the VSD using a capacity control algorithm with the current or measured operating conditions or parameters of the motor and/or system as an input and then select the appropriate voltage corresponding to that operating frequency from the capacity control algorithm that provides maximum efficiency. In yet another embodiment, the control panel can control the VSD to iteratively cycle through various V/f ratios and select the one that provides the best efficiency. In still another embodiment, the V/f ratio can be calculated from a control algorithm, such as a fuzzy logic algorithm, based on the measured operating conditions or parameters of the motor and/or system.

Figure 16:
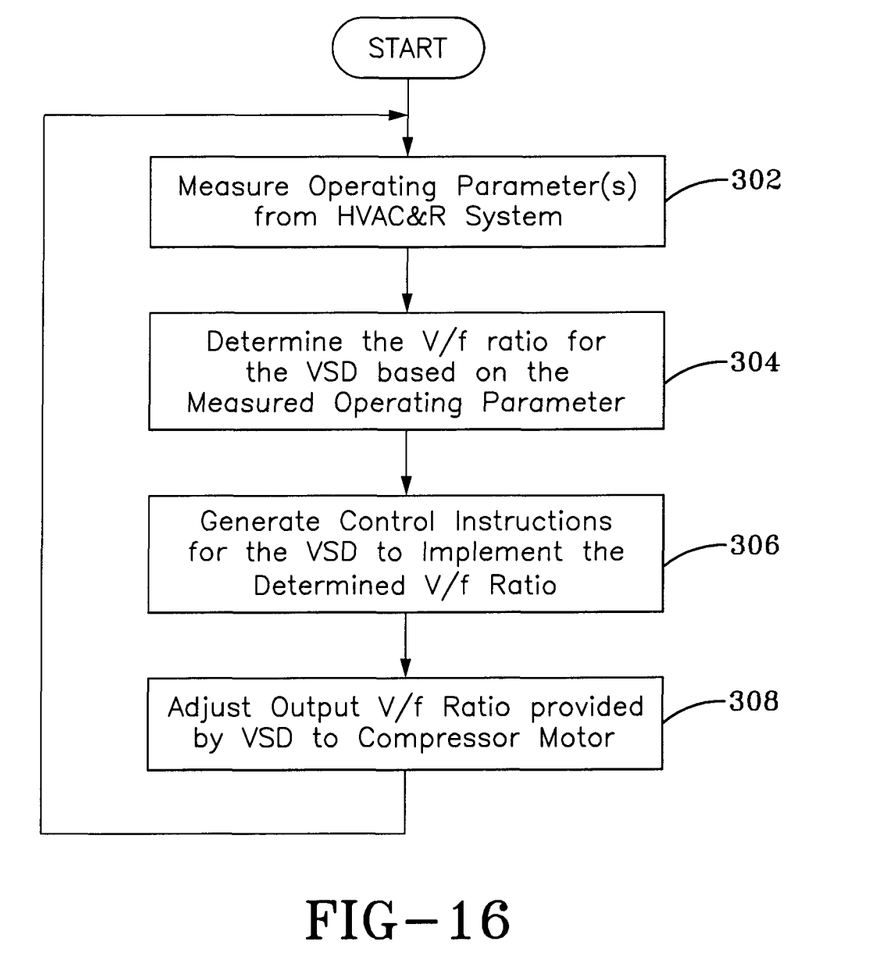
FIG. 16 shows an exemplary embodiment of a process for adjusting the V/f ratio of a variable speed drive.

FIG. 16 shows an exemplary embodiment of a control process executed by the control panel to vary the V/f ratio of a VSD. The process begins by measuring one or more operating parameters from the HVAC&R system (step 302). In one embodiment, the measured operating parameter can be the motor's power consumption (kW). However, in other embodiments, different operating parameters, e.g., compressor discharge temperature, motor temperature or motor current, can be used in addition to or instead of the motor's power consumption. Next, a V/f ratio for the VSD is determined from the measured operating parameter (step 304). In one embodiment, the determined V/f ratio can be determined from one or more tables that correspond the measured operating parameters to V/f ratios. In other embodiments, one or more control algorithms can be used to determine or calculate the V/f ratio using the measured operating parameter or other preselected parameters. Once the V/f ratio for the VSD has been determined, the control panel can generate control instructions for the VSD to implement the determined V/f ratio (step 306). The output of the VSD is then adjusted using the control instructions to provide the determined V/f ratio to the compressor motor (step 308). The process then returns to the start to repeat the process.

For FIGS. 6-13, an HVAC system was operated at different V/f ratios. The HVAC system used R-134a refrigerant, and operated at a condenser temperature of about 100° Fahrenheit (F) and an evaporator temperature of about 40° F. In each of FIGS. 6-11, the compressor (adiabatic) efficiency, i.e., the ratio of the theoretical power consumption for the compressor to the actual power consumption ($W_{theo}/W_{actual}$), is shown for a range of frequencies and a particular V/f ratio. In addition, a temperature of the compressor motor is shown for the same range of frequencies and particular V/f ratio.

Figure 14:
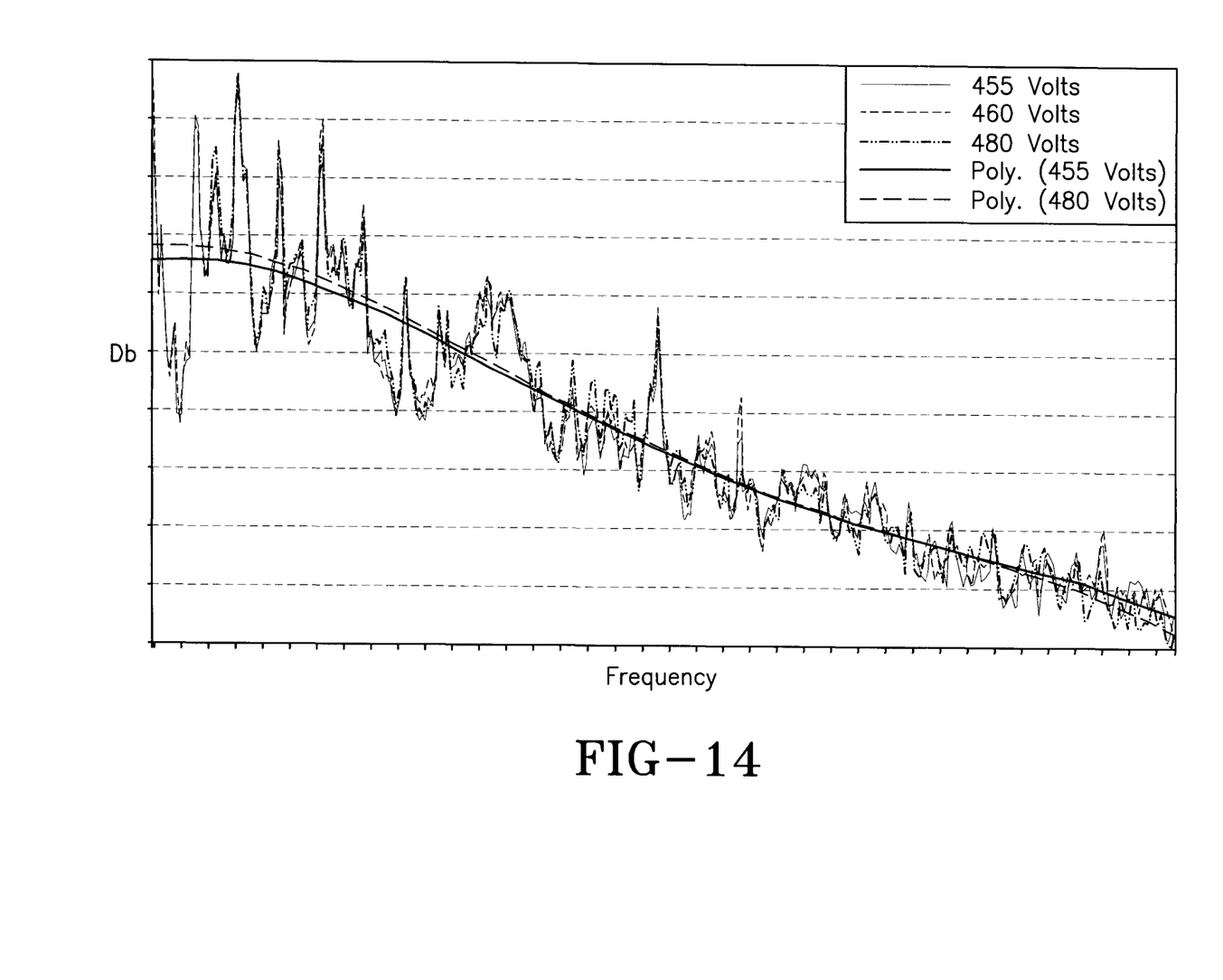
FIG. 14 shows a chart of peak sound levels versus frequency for different V/f ratios used in an exemplary HVAC&R system.
Figure 15:
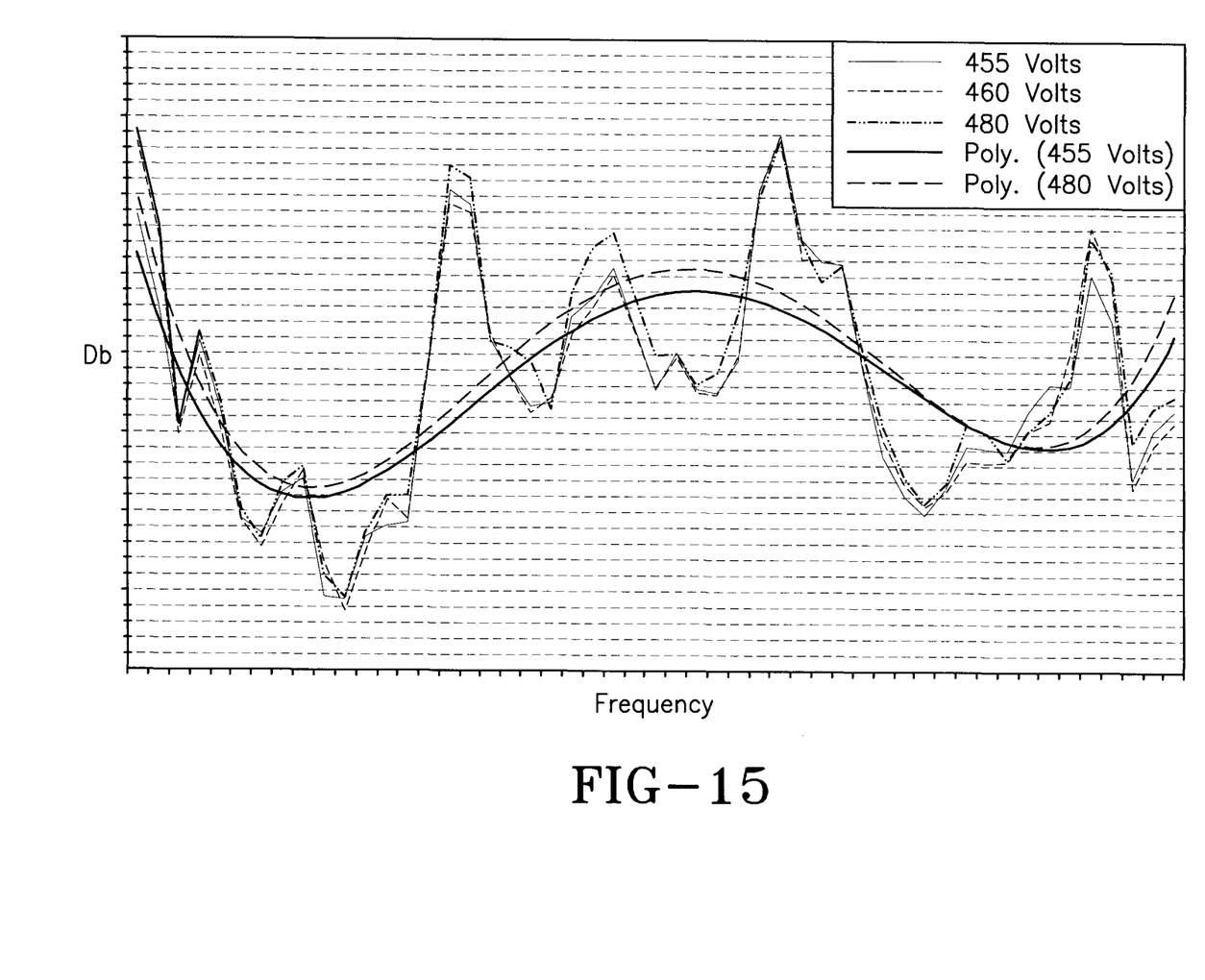
FIG. 15 shows an enlarged portion of the chart of FIG. 14.

In another embodiment, the V/f ratio can be varied for sound attenuation purposes since noise can be generated by vibrations within the motor. As shown in FIGS. 14 and 15, different V/f ratios produce different peak noise levels in the compressor and an optimum V/f can be selected to reduce noise levels in the compressor. In FIGS. 14 and 15, the "Poly" lines represent trend data for the corresponding voltage identified. The optimum V/f can be selected in a manner similar to that previously described for motor/system efficiency and can be dependent upon the selected motor and the applied load.

It is important to note that the construction and arrangement of the present application as shown in the various exemplary embodiments is illustrative only. Although only a few embodiments have been described in detail in this application, those who review this application will readily appreciate that many modifications are possible (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter described in the application. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present application. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the exemplary embodiments without departing from the scope of the present application. Accordingly, the present application is not limited to a particular embodiment, but extends to various modifications that nevertheless fall within the scope of the appended claims.

Furthermore, in an effort to provide a concise description of the exemplary embodiments, all features of an actual implementation may not have been described (i.e., those unrelated to the presently contemplated best mode of carrying out the invention, or those unrelated to enabling the invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A system comprising:
   a compressor, a condenser, an expansion device and an evaporator connected in a closed refrigerant circuit;
   a motor connected to the compressor to power the compressor;
   a variable speed drive connected to the motor to power the motor, the variable speed drive being operable to provide a variable voltage to the motor and a variable frequency to the motor;
   a control panel to control operation of the variable speed drive and one or more components of the system;
   a sensor to measure an operational parameter of the system, the sensor being operable to communicate the measured operational parameter to the control panel; and
   the control panel being operable to execute a control algorithm to adjust a voltage-to-frequency ratio to be output by the variable speed drive based at least on the measured operational parameter, wherein the determined voltage-to-frequency ratio optimizes sound attenuation of the compressor, and wherein the voltage-to-frequency ratio is between 1.5 Volts/Hertz and 2.0 Voltz/Hertz.

2. The system of claim 1 wherein the sensor measures power consumption of the motor.

3. The system of claim 1 wherein the sensor measures a discharge temperature of the compressor.

4. The system of claim 1 wherein the sensor measures a temperature of the motor.

5. The system of claim 1 wherein the control algorithm includes a table of voltage-to-frequency ratios and corresponding operational parameter values.

6. The system of claim 1 wherein the control algorithm includes a fuzzy logic algorithm to determine the voltage-to-frequency ratio.

7. A method for controlling a variable speed drive, the method comprising:
   measuring an operational parameter of an HV AC&R system;
   determining a voltage-to-frequency ratio to be output by a variable speed drive using the measured operational parameter, the variable speed drive powering a compressor motor of the HV AC&R system;
   generating control instructions for the variable speed drive based on the determined voltage-to-frequency ratio;
   adjusting the output voltage-to-frequency ratio provided by the variable speed drive to the compressor motor with the generated control instructions, wherein the output voltage-to-frequency ratio is between 1.5 Volts/Hertz and 2.0 Voltz/Hertz; and
   optimizing sound attenuation of a compressor driven by the compressor motor with the determined voltage-to-frequency ratio.

8. The method of claim 7 wherein said measuring an operational parameter includes measuring power consumption of the compressor motor.

9. The method of claim 7 wherein said measuring an operational parameter includes measuring a discharge temperature of a compressor.

10. The method of claim 7 wherein said measuring an operational parameter includes measuring a temperature of the compressor motor.

11. The method of claim 7 wherein said determining a voltage-to-frequency ratio includes selecting a voltage to frequency ratio from a table of voltage-to-frequency ratios and corresponding operational parameter values.

12. The method of claim 11 further comprising operating the HVAC&R system at varying conditions and voltage to frequency ratios to populate the table.

13. The method of claim 7 wherein said determining a voltage-to-frequency ratio includes executing a fuzzy logic algorithm to determine the voltage-to-frequency ratio.

14. The method of claim 7 further comprising optimizing compressor efficiency with the determined voltage-to-frequency ratio and the optimized sound attenuation.

* * * * *